United States Patent [19]

Khuzai et al.

[11] Patent Number: 5,063,787
[45] Date of Patent: Nov. 12, 1991

[54] VENTURI ARRANGEMENT

[75] Inventors: Kamel A. Khuzai, Morgan Hill; Rameschandra D. Patel, San Jose, both of Calif.

[73] Assignee: General Electric Company, San Jose, Calif.

[21] Appl. No.: 584,220

[22] Filed: Sep. 18, 1990

Related U.S. Application Data

[63] Continuation-in-part of Ser. No. 440,152, Nov. 22, 1989, abandoned.

[51] Int. Cl.$^5$ .............................................. G01F 1/44
[52] U.S. Cl. ................................................. 73/861.64
[58] Field of Search ........... 73/861.63, 861.64, 861.62, 73/861.61

[56] References Cited

U.S. PATENT DOCUMENTS

| | | | |
|---|---|---|---|
| 3,774,645 | 11/1973 | Pompa | 73/861.63 X |
| 3,859,853 | 1/1975 | Khuzaie | 73/861.64 |
| 3,889,537 | 6/1975 | Khuzaie | 73/861.64 |

Primary Examiner—Herbert Goldstein
Attorney, Agent, or Firm—Robert R. Schroeder

[57] ABSTRACT

The present invention is directed to a venturi arrangement for use in measuring the flow rate of a fluid passed through a pipe bearing a venturi wherein the drawbacks associated with prior configurations have been ameliorated. The novel venturi arrangement comprises a pipe having a diameter, D, supplied in two sections, an upstream section and a downstream section, each of which preferably is flanged. Each of these pipe sections is fitted with a pair of pressure taps. A venturi comprising an annulus of diameter, D, has edges which are welded to said pipe sections to form an integral, fluid-conveying unit. A curvilinear conveying inlet section is integrally formed with the annulus. A throat section is integrally formed with the curvilinear conveying inlet section and contains a pair of pressure take-off apertures, each of which is connected by a flexible line to the downstream pipe pressure taps. Finally, a diverging diffuser section is integrally formed with the throat section. The diffuser section is not welded to or otherwise in contact with the pipe (i.e. free end). The pipe pressure taps are connected to a calibrated differential pressure transmitter in order to measure flow rates of fluids, e.g. steam and water, passed through the venturi arrangement.

20 Claims, 4 Drawing Sheets

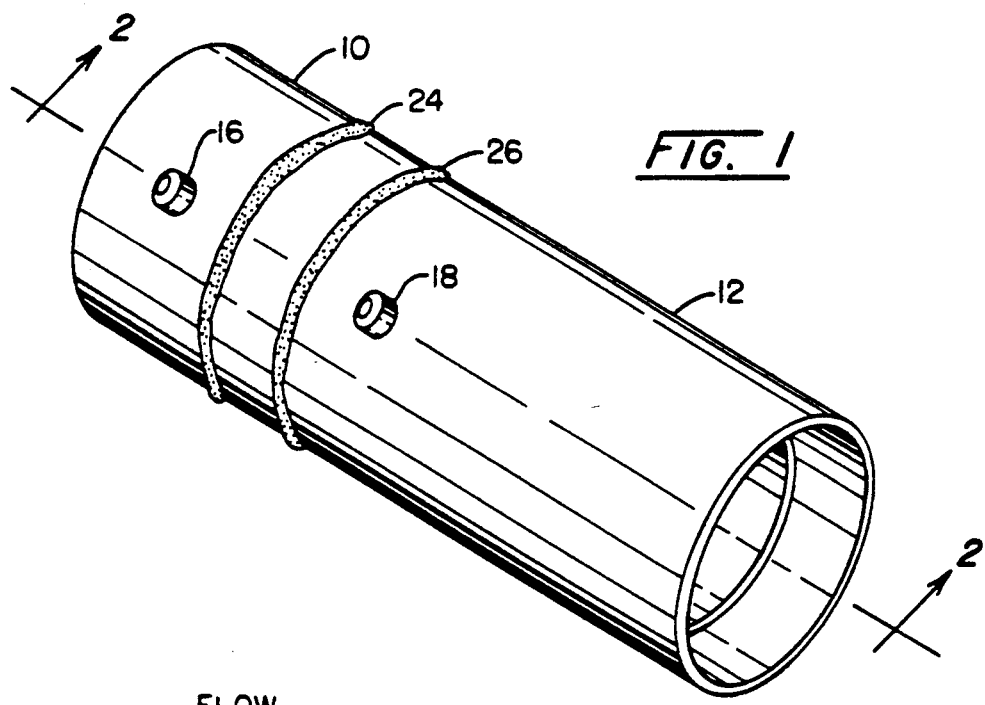
FIG. 1
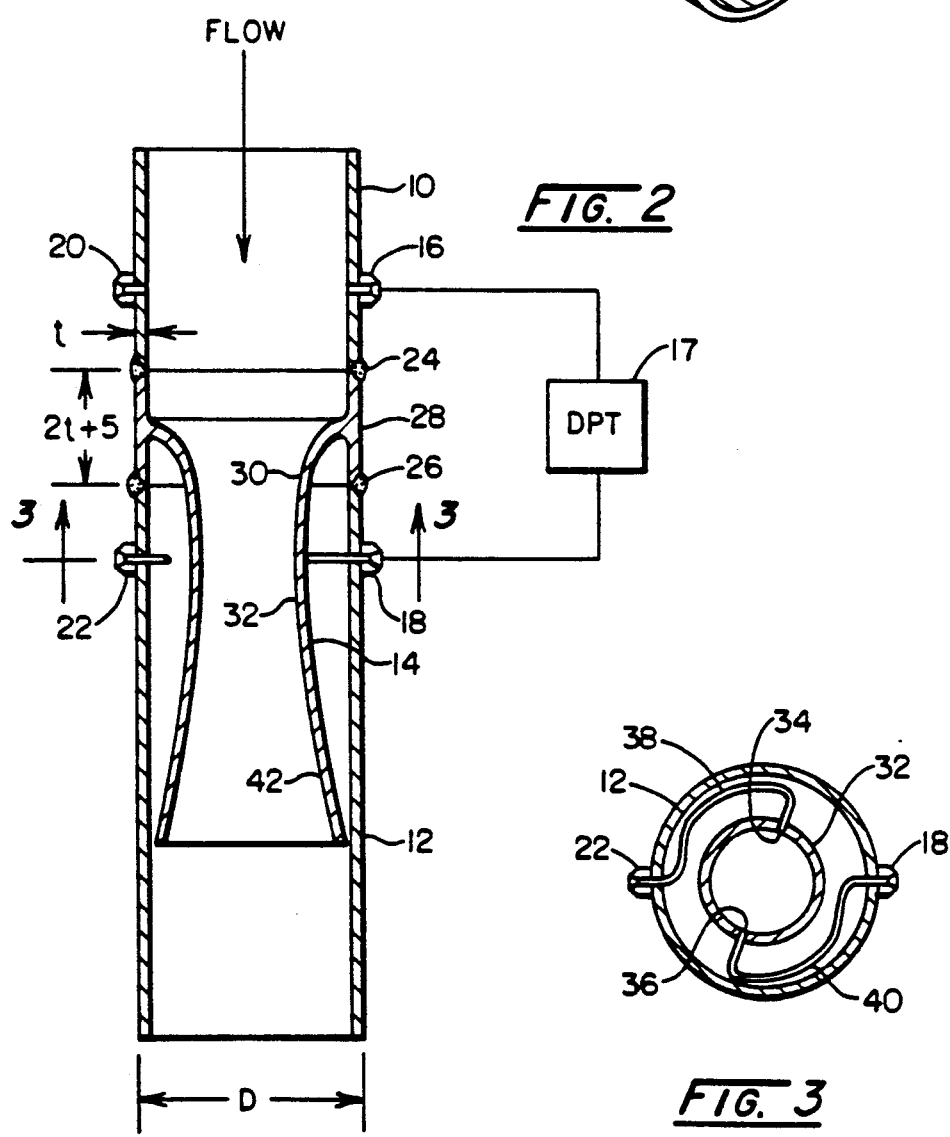
FIG. 2
FIG. 3

VENTURI ARRANGEMENT

This application is a continuation-in-part of application Ser. No. 07/440,152, filed Nov. 22, 1989, now, abandoned.

BACKGROUND OF THE INVENTION

The present invention relates to the measurement of fluid flow rates through piping and more particularly to an improved venturi arrangement therefor.

The measurement of steam and water flow rates in steam power plants (both conventional and nuclear) is a required operation at a variety of junctures in the various steam and water circuits comprising the steam power plant. Steam produced from a pressure vessel is taken through a steam line and applied to a steam turbine. Exhaust steam from the turbine is condensed and returned to the pressure vessel as feedwater. It is desirable to measure the flow rate of the steam through the main steam lines to the turbine as well as to place a restriction in the steam lines to limit the escape of steam and water from the pressure vessel during the period of time required for shut-off valves to close in the unlikely event that the steam lines become open. In a nuclear steam generating facility, this is known as a loss of coolant accident (LOCA) where a primary or secondary pipe break may occur in the piping system either outside or inside the dry well and the rate of loss of coolant exceed a rate of normal feedwater make-up. It is a mechanical and economic advantage if flow measurement and flow restriction both can be achieved utilizing the same device.

If a constriction is placed in a closed channel carrying a stream of fluid, there will be an increase in velocity, and hence an increase in kinetic energy, at the point of constriction. From an energy balance, as given by Bernoulli's Theorem, there must be a corresponding reduction in pressure. Rate of discharge from the constriction can be calculated knowing this pressure reduction, the area available for flow at the constriction, density of the fluid, and the coefficient of discharge. The latter is defined as the ratio of actual flow to the theoretical flow, and makes allowance for stream contraction and frictional effects. A standard, Herschel-type venturi meter consists of a short length of straight tubing connected at either end to the pipe by conical sections. The straight and conical sections should be joined by smooth curved surfaces for best results. From a variety of practical working equations known in the art, the flow of fluid through the venturi meter can be measured by a calibrated differential pressure meter connected to a pressure tap in the throat section of the venturi and to a line pressure tap preferably placed in the fluid line upstream of the venturi meter.

The venturi configuration set forth in U.S. Pat. No. 3,859,853 can be used to obtain good, accurate measurement of steam flow when the venturi is installed in a vertical piping configuration. The same arrangement also can be used for measuring recirculation water flow and feedwater flow entering reactor pressure vessels located at steam power plants. The circumferential welding of the venturi downstream section to the internal surface of the pipe, however, requires a cumbersome analysis to substantiate its pressure integrity during plant normal operation as well as during a LOCA. Another problem with such configuration is the requirement for in-service inspection (ISI) of any part welded to a primary pressure retaining component (i.e., main steam and recirculation piping) when the steam power plant utilizes nuclear fuel. Since this inner weld cannot be inspected from outside the piping, a detailed analysis is required to be performed in order to comply with the code requirements. Also, this weld technically is not a full-penetration weld in accordance with ASME-III Code Definition, Section XI. The venturi arrangement set forth in U.S. Pat. No. 3,889,537 addresses some of these problems, yet it still is not entirely satisfactory.

BROAD STATEMENT OF THE INVENTION

Broadly, the present invention is directed to a venturi arrangement for use in measuring the flow rate of a fluid passed through a pipe bearing a venturi wherein the drawbacks associated with prior configurations have been ameliorated. The novel venturi arrangement comprises a pipe having a diameter, D, supplied in two sections, an upstream section and a downstream section. Each of these pipe sections is fitted with a pair of pressure taps. A venturi comprising an annulus of diameter, D, has edges which are welded to said pipe sections to form an integral, fluid-conveying unit. A curvilinear conveying inlet section is integrally formed with the annulus. A throat section is integrally formed with the curvilinear conveying inlet section and contains a pair of pressure take-off apertures, each of which is connected by a flexible line to the downstream pipe pressure tap. Finally, a diverging diffuser section is integrally formed with the throat section. The diffuser section is not in contact with the pipe. The pipe pressure taps are connected to a calibrated differential pressure transmitter in order to measure flow rates of fluids, e.g. steam and water, passed through the venturi arrangement.

In a preferred configuration where the venturi arrangement is installed in a vertical pipe configuration, the throat section contains a pair of oppositely-disposed take-off apertures which are connected to two downstream pipe pressure taps by flexible internal tubing, and each pressure tap is located about 120° from its corresponding throat take-off aperture. This arrangement allows drainage of condensed steam back to the main steam piping and can be used in any pipe configuration where water or other liquid fluid is being measured.

A preferred configuration when the venturi arrangement is installed in a horizontal pipe configuration comprises a pair of horizontally-disposed take-off apertures located at the throat section, each of which is connected by flexible internal tubing to a pair of downstream pipe pressure taps that are disposed on the upper side of the downstream pipe section, and the pressure taps are located about 90° from their corresponding take-off apertures. This configuration is designed to prevent any steam condensed being trapped in the flexible tube which would cause gross inaccuracies in the steam flow rate measurement. This flexible tube design when installed horizontally will permit drainage of condensed steam back into the main steam piping. This design also can be used in any pipe configuration for water or other liquid flow applications. Preferably, each pipe section is flanged whether the venturi arrangement is oriented horizontally or vertically.

Advantages of the present invention include the use of welds to pipe that are accessible for ISI, such as required by ASME, Section XI. Another advantage is the ease of access to the venturi arrangement of the present invention. Another advantage is the ability to utilize stainless steel material in construction of the venturi arrangement, thus providing protection against erosion/corrosion phenomena which have negative effects on the pressure recovery value. These and other advantages will be readily apparent to those skilled in the art based upon the disclosure contained herein.

BRIEF DESCRIPTION OF THE DRAWINGS

FIG. 1 is a perspective, elevational view of the venturi arrangement showing the two pipe sections and venturi which have been welded into an integral unit;

FIG. 2 is a sectional view taken along line 2—2 of FIG. 1;

FIG. 3 is a sectional view taken along line 3—3 of FIG. 2;

Figure 4:
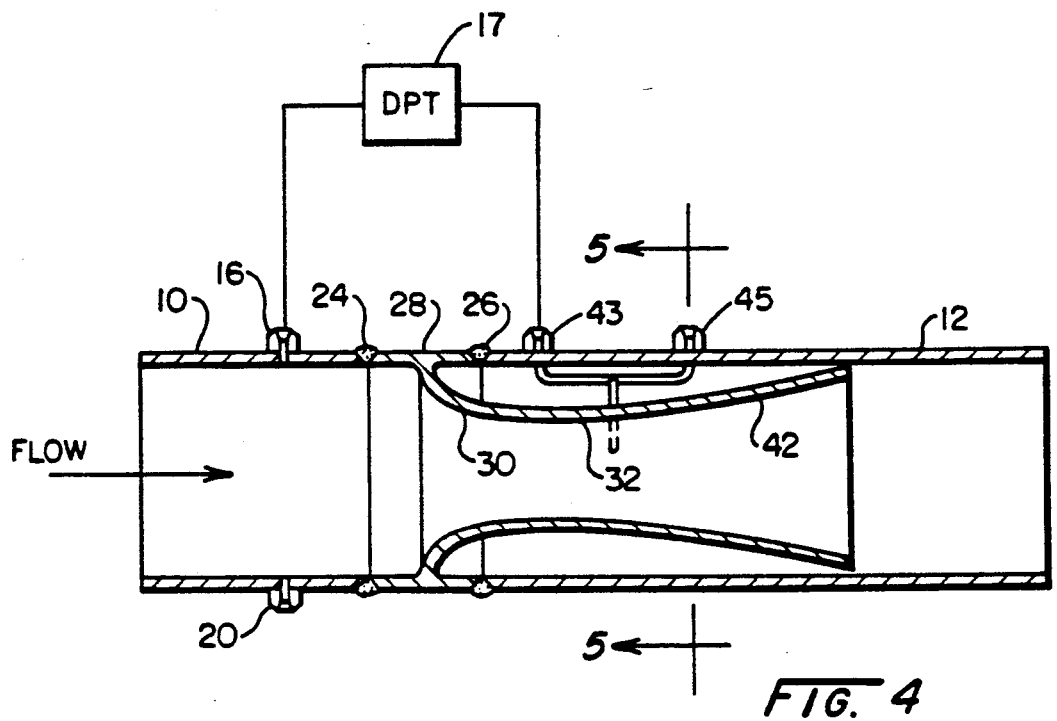
FIG. 4 is a sectional view like that depicted at FIG. 2, but for an alternative embodiment.

The drawings will be described in detail in connection with the following description.

DETAILED DESCRIPTION OF THE INVENTION

The three basic elements that comprise the invention include upper pipe section 10, lower pipe section 12, and venturi 14 (FIG. 2). Pipe section 10 bears pressure tap 16 while downstream pipe section 12 bears pressure tap 18. As those skilled in the art will appreciate, lines can be connected from pressure taps 16 and 18 to differential pressure transmitter 17 which can be calibrated for directly measuring flow rates passed through the venturi arrangement. In the embodiment depicted at FIGS. 1-3, upstream pipe section 10 also bears pressure tap 20 while downstream pipe section 12 also bears pressure tap 22. Thus, each pipe section has a pair of pressure taps for connection to differential pressure transmitter 17. Pipe sections 10 and 12 are joined by welds 24 and 26 which are entirely visible from the outside of the piping and can be visually inspected readily. Further, the use of only two external welds for joining all of the components comprising the venturi arrangement means that a full penetration weld is being used as defined by ASME-III code definition.

Referring more particularly to FIGS. 2 and 3 which depict an embodiment especially designed for use in vertical pipe configuration for the measurement of steam, it will be seen that both pipe sections 10 and 12 have a diameter, D, which diameter also is the same for annulus 28 which is part of venturi 14. This size equivalence permits the joining of the three components as can be seen by reference to FIG. 2, for example. For a given pipe thickness, t, preferably the width of annulus 28 is equal to 2 t+5, when centimeters is the unit of measurement.

Integrally formed with annulus 28 is curvilinear conveying inlet section 30. Throat section 32 is integrally formed with curvilinear throat section 30 and provides the narrowest diameter of venturi 14 through which the flow passes. It is at this juncture that the pressure of the flow is at a minimum and it is at throat section 32 that take-off apertures 34 and 36 (FIG. 3) are located. Apertures 34 and 36 are connected to pressure taps 18 and 22, respectively, by lines 38 and 40, respectively. Preferably, lines 38 and 40 are flexible and are fabricated from stainless steel stock. It will be observed that pressure tap 18 is located about 120° from aperture 36 as is pressure tap 22 from aperture 34. The arrangement depicted is designed to prevent condensed steam from being trapped in the flexible tube which would cause gross inaccuracies in the steam measurement. The flexible tube design, when the venturi arrangement is installed vertically and when the elevation of pressure taps 18 and 22 is higher by at least 1.27 cm (0.5 inch) than their respective apertures 36 and 34, will allow drainage of condensed steam back into the main steam piping. The design set forth at FIGS. 2 and 3, however, can be used in any configuration when liquid flow, e.g. water, is being measured.

Finally, integrally formed with throat section 32 is diverging diffuser section 42. It will be observed that curvilinear section 30, throat 32, and diffuser section 42, all are in spaced-apart relationship from the inside of downstream pipe section 12. This arrangement means that only welds 24 and 26 need to be inspected to ensure integrity of the installation of venturi 14 with pipe sections 10 and 12. The length of venturi 14 and the amount of stand-off from the interior of downstream pipe section 12 depends upon diameter D, the type of fluid measured and its flow rate, and other factors well known to those skilled in this art.

Figure 5:
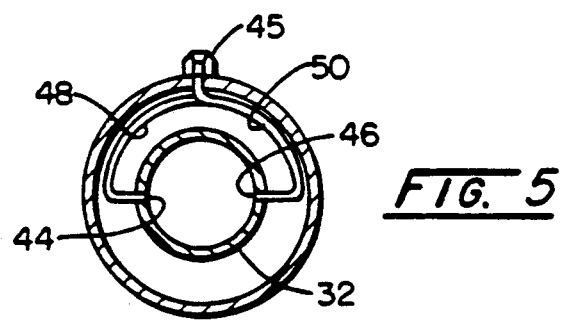
FIG. 5 is a sectional view taken along line 5—5 of FIG. 4.

With reference to FIGS. 4 and 5, an alternative arrangement is depicted and is especially designed for use when steam or other condensible fluid is being passed through a horizontal pipe configuration. The only difference between the configuration set forth at FIG. 4 and that configuration set forth at FIG. 2 is the location of downstream pipe section pressure taps 43 and 45 which can be seen to be both located on the top of pipe section 12. Throat section 32 contains a pair of horizontally disposed, oppositely-disposed take-off apertures 44 and 46. Aperture 44 is connected by flexible line 48 to pressure tap 43 while aperture 46 is connected by flexible pressure line 50 to pressure tap 45. It will be observed that the pressure taps and apertures are disposed about 90° apart. This flexible tube design, when the venturi arrangement is installed horizontally, permits drainage of condensed steam back into the main steam piping, thus avoiding gross inaccuracies in steam measurement caused by steam being condensed in the pressure lines. For water or other liquid fluid application, the embodiment set forth at FIGS. 4 and 5 can be used in any orientation.

Figure 6:
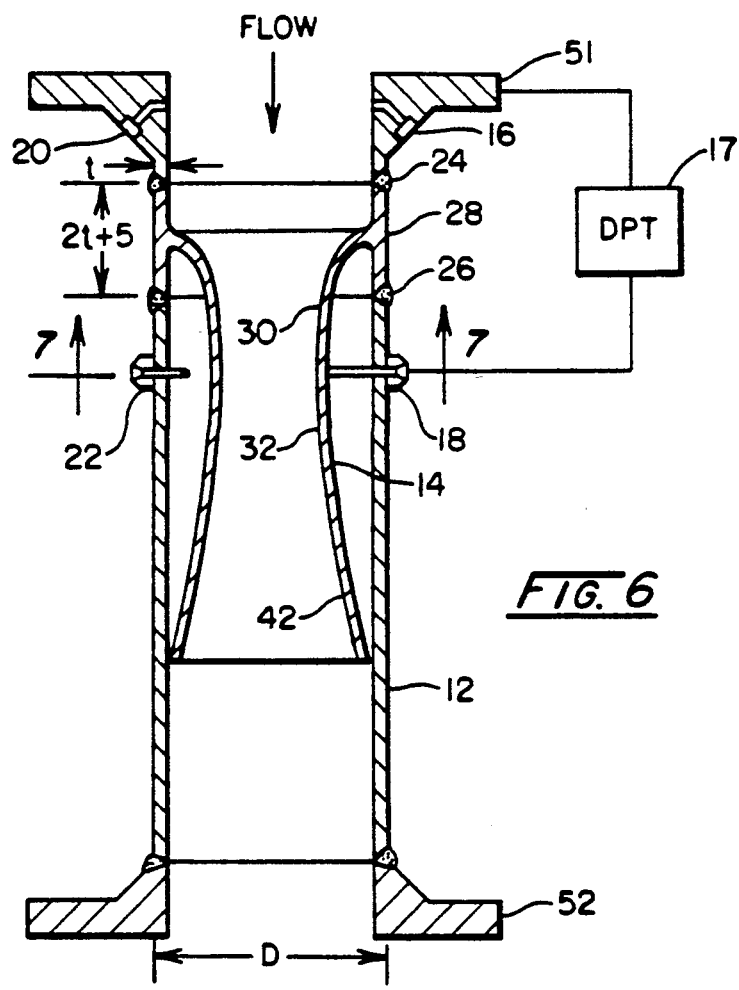
FIG. 6 is a sectional view like FIG. 2, but with the preferred flanged pipe sections.
Figure 7:
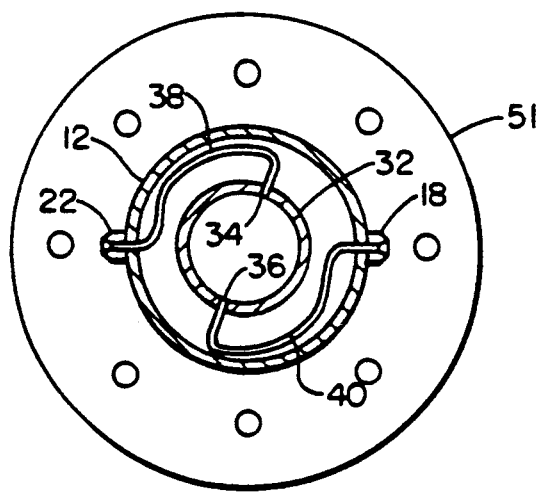
FIG. 7 is a sectional view taken along line 7—7 of FIG. 6.
Figure 8:
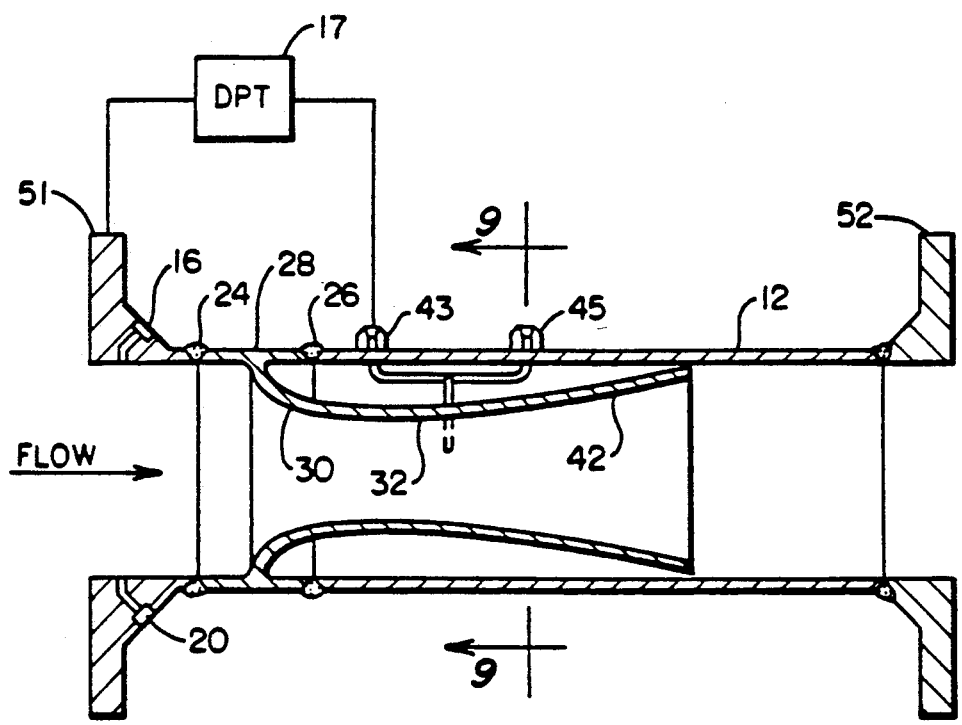
FIG. 8 is a sectional view like FIG. 4 but with the preferred flanged pipe sections.
Figure 9:
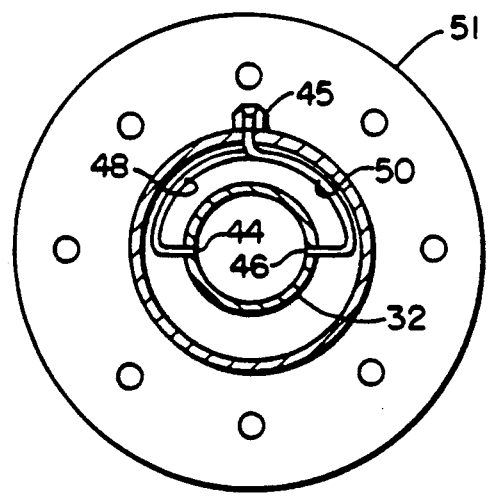
FIG. 9 is a sectional view taken along line 9—9 of FIG. 8.

In the preferred use of the venturi arrangement in a nuclear power plant, thermal power is calculated in the process computer primarily by determing the amount of energy that is required to convert the feedwater entering the reactor into steam. The amount of feedwater entering the reactor vessel is the most significant factor, contributing 99% to the input for determination of reactor power. Experience shows the existence of several types of degradation which will affect the flow meter accuracy. Such degradations include increased roughness in the critical surfaces of the flow meter, blockage of instrument tubing, accumulation of iron oxide build-up and crud build-up which may impair the flow meter accuracy, and pittings on critical surfaces of the flow meter. Qualitative and quantitative periodic inspection normally is required in order to determine any degradation of the interior surfaces of the flow meter. To facilitate the periodic inspection of the venturi arrangement of the present invention, reference is made to FIGS. 6-9 which correspond to FIGS. 2-5, except for a flanged arrangement as described below. With respect to FIGS. 6 and 7, upstream of annulus 28 is apertured flanged 51 which retains pressure taps 16 and 20. Downstream of annulus 28 is apertured flange 52. With respect to the horizontal venturi arrangement depicted at FIGS. 8 and 9, apertured flanges 51 and 52 again are provided. By bolting the venturi arrangement with similarly flanged pipe sections upstream and downstream of the venturi arrangement, the venturi arrangement can be removed for periodic inspection relatively easily. After inspection and repair, if necessary, of the venturi arrangement, the flanged arrangement can be reinstalled and the line put back in service.

As for materials of construction, venturi 14, and for that matter pipe sections 10 and 12, advantageously are fabricated from metal and preferably stainless steel or similar material when corrosion and erosion effects can be expected. It is an advantage to the design of the venturi arrangement of the present invention that the welds can be formed from dissimilar or similar metal depending upon application of the venturi arrangement. The same goes for materials of construction of pipe sections in venturi 14. As noted above, the flexible internal tubing for pressure measurement preferably are fabricated from stainless steel stock. Further, it will be appreciated that various of the components shown or described herein may be altered or varied in accordance with conventional wisdom in the field and certainly are included within the present invention, provided that such variations do not materially vary within the spirit and precepts of the present invention as described herein.

We claim:

1. A venturi arrangement for use in measuring the flow rate of a fluid passed through a pipe bearing a venturi, which comprises:
   a pipe having a diameter, D, supplied in two sections, an upstream section and a downstream section, and fitted with a pair of upstream pressure taps and a pair of downstream pressure taps; and
   a venturi comprising an annulus of diameter, D, having edges which are welded to said pipe sections to form an integral fluid-conveying unit, a curvilinear conveying inlet section integrally formed with said annulus, a throat section integrally formed with said curvilinear conveying inlet section and containing a pair of pressure take-off apertures, each of which is connected by a line to said downstream pipe pressure taps, and a diverging diffuser section integrally formed with said throat section.

2. The venturi arrangement of claim 1 wherein each said pipe section has a thickness, t, and said annulus has a width equal to about $2t+5$, as measured in centimeters.

3. The venturi arrangement of claim 1 which is fabricated from stainless steel.

4. The venturi arrangement of claim 1 wherein each of said pipe sections is flanged.

5. The venturi arrangement of claim 1 wherein each said pair of pressure taps for said upstream section and said downstream section are oppositely disposed about each said pipe section, and each said pressure take-off aperture is located about 120° from each downstream pipe pressure tap to which it is connected.

6. The venturi arrangement of claim 1 wherein each said upstream section pipe pressure taps are oppositely disposed about said upstream pipe section, each said downstream pipe section pressure taps are located on the same side thereof, and each said pressure take-off aperture is located about 90° from each downstream pipe pressure tap to which it is connected.

7. The venturi arrangement of claim 5 which is oriented vertically.

8. The venturi arrangement of claim 7 wherein the elevation of said pair of pressure taps is higher by at least 1.27 cm than their respective pressure take-off apertures.

9. The venturi arrangement of claim 6 which is oriented horizontally.

10. The venturi arrangement of claim 1 wherein said line to said downstream pressure tap is flexible and said throat section is not in contact with said pipe.

11. A method for measuring the flow rate of a fluid passed through a pipe which comprises:
   providing a venturi arrangement for said pipe wherein said pipe having a diameter, D, is supplied in two section, an upstream section and a downstream section, and being fitted with a pair of upstream pressure taps and a pair of downstream pressure taps, said venturi arrangement further comprising a venturi which comprises an annulus of diameter, D, having edges which are welded to said pipe sections to form an integral fluid-conveying unit, a curvilinear conveying inlet section integrally formed with said annulus, a throat section integrally formed with said curvilinear conveying inlet section and containing a pair of pressure take-off apertures, each of which is connected by a line to said downstream pipe pressure taps, and a diverging diffuser section integrally formed with said throat section; and
   measuring the difference in pressure as sensed between said upstream pressure tap and said downstream pressure tap, said pressure difference calibrated to the fluid flow rate passed through said pipe.

12. The method of claim 11 wherein each said pipe section has a thickness, t, and said annulus has a width equal to about $2t+5$, as measured in centimeters.

13. The method of claim 11 wherein said pipe sections and venturi are fabricated from stainless steel.

14. The method of claim 11 wherein each of said pipe sections is flanged.

15. The method of claim 11 wherein each said pair of pressure taps for said upstream section and said downstream section are oppositely disposed about each said pipe section, and each said pressure take-off aperture is located about 120° from each downstream pipe pressure tap to which it is connected.

16. The method of claim 11 wherein each said upstream section pipe pressure taps are oppositely disposed about said upstream pipe section, each said downstream pipe section pressure taps are located on the same side thereof, and each said pressure take-off aperture is located about 90° from each downstream pipe pressure tap to which it is connected.

17. The method of claim 15 said venturi arrangement is oriented vertically.

18. The method of claim 17 wherein said pair of pressure taps is disposed at an elevation at least 1.27 cm above their respective pressure take-off apertures.

19. The method of claim 16 wherein said venturi arrangement is oriented horizontally.

20. The method of claim 1 wherein said line to said downstream pipe pressure tap is flexible and said throat section is not in contact with said pipe.

* * * * *

UNITED STATES PATENT AND TRADEMARK OFFICE
CERTIFICATE OF CORRECTION

PATENT NO. : 5,063,787

DATED : November 12, 1991

INVENTOR(S) : KAMEL A. KHUZAIE ET AL

It is certified that error appears in the above-identified patent and that said Letters Patent is hereby corrected as shown below:

On the title page, under item [19], "Khuzai" should be --Khuzaie--; and in item [75], "Kamel A. Khuzai" should be
--Kamel A. Khuzaie--.

Signed and Sealed this

Sixteenth Day of March, 1993

Attest:

STEPHEN G. KUNIN

*Attesting Officer*  *Acting Commissioner of Patents and Trademarks*